United States Patent [19]

Nozu et al.

[11] Patent Number: 5,090,000
[45] Date of Patent: Feb. 18, 1992

[54] HEIGHT ADJUSTING DEVICE FOR A PICKUP

[75] Inventors: Shinsaku Nozu; Tetsuo Shimizu; Seiji Ohmori, all of Tokorozawa, Japan

[73] Assignee: Pioneer Electronic Corporation, Tokyo, Japan

[21] Appl. No.: 330,271

[22] Filed: Mar. 29, 1989

[30] Foreign Application Priority Data

Jul. 4, 1988 [JP] Japan .................. 63-166570

[51] Int. Cl.$^5$ ................................. G11B 7/00
[52] U.S. Cl. ................... 369/44.25; 369/44.11; 369/253; 369/244; 250/201.5
[58] Field of Search .............. 369/44.11, 44.25, 126, 369/244, 247, 251, 253; 250/201.1, 201.5; 360/114, 109

[56] References Cited

U.S. PATENT DOCUMENTS 4,769,803  9/1988  Yamamiya ................ 369/44.25

Primary Examiner—Roy N. Envall, Jr.
Assistant Examiner—Hindi Nabil
Attorney, Agent, or Firm—Fleit, Jacobson, Cohn, Price, Holman & Stern

[57] ABSTRACT

A height adjusting device for adjusting the height of a pickup, comprises a support mechanism for supporting the pickup on the carriage in a manner that a position of the pickup along the axis of rotation of the turntable of the optical disc player is adjustable and an adjusting device for driving the support mechanism to adjust the position of the pickup. The adjusting device generates a height position signal indicative of the position of the pickup and the support mechanism is driven in response to the magnitude of the height position signal only when the magnitude of the height position signal is greater than a predetermined level. According to the other aspect of the invention, a compensated height position signal is generated by superimposing a compensating signal indicative of the position of the optical system of the pickup relative to the housing of the pickup on the height position signal, and the support mechanism is driven in response to the magnitude of the compensated height position signal.

15 Claims, 4 Drawing Sheets

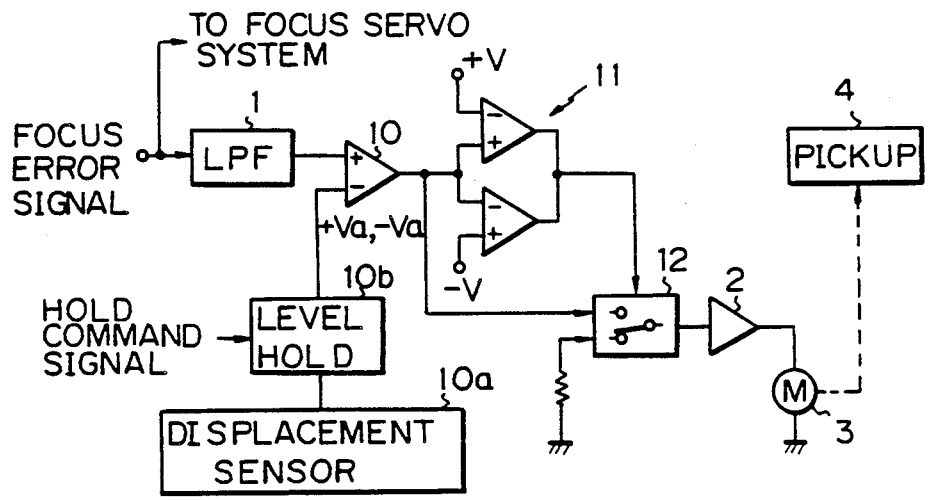
Fig. 2
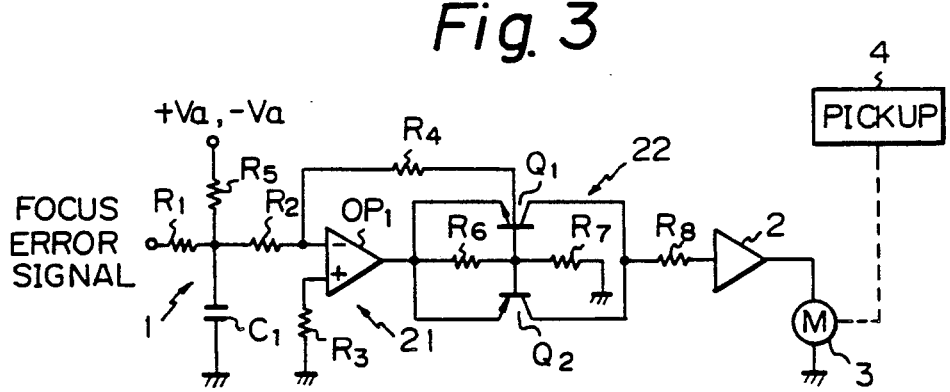
Fig. 3
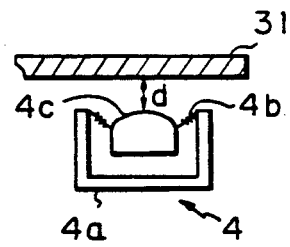 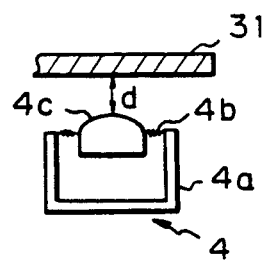
Fig. 4A  Fig. 4B

Fig. 5A
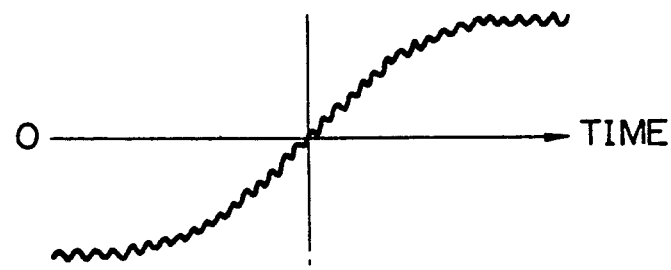
Fig. 5B
Fig. 5C
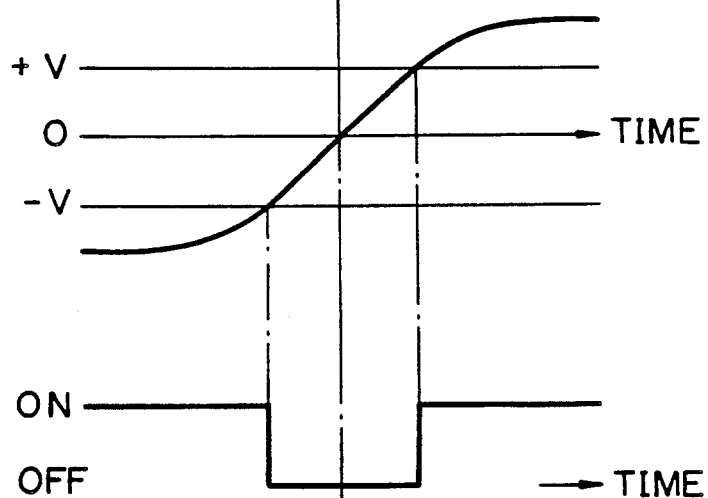
Fig. 5D
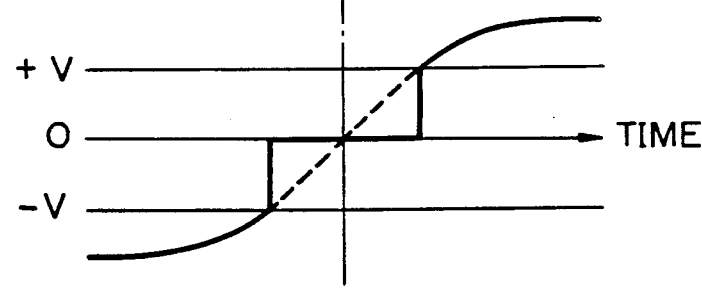

HEIGHT ADJUSTING DEVICE FOR A PICKUP

BACKGROUND OF THE INVENTION

1. Field of the Invention

The present invention relates to a height adjusting device for a pickup of an optical disc player.

2. Description of Background Information

In optical disc players for playing an optical information recording disc, a focus servo mechanism is used for focusing an information reading light beam on the recording surface of the disc, so as to obtain an information reading spot. The focus servo operation is performed in such a way that an objective lens of the pickup is moved by an actuator comprising a moving coil, for example, so that its distance from the disc surface is maintained constant.

By means of this focus servo operation, an information reading spot having an appropriate shape is formed on the recording surface irrespective of the difference in the disc thickness, or the fluctuation of the disc surface. However, due to variations in the disc thickness for example, there can be a deflection of the operating position of the focus actuator in a direct-current fashion. With such a deflection of the direct-current fashion, a direct current would always flow through the focus actuator, to invite the generation of heat in the coil of the focus actuator, or further to reduce the margin of the servo loop gain.

In order to cope with such a problem, a structure shown in FIG. 1, disclosed in Japanese Patent Publication No. P53-26124, is known in which the whole system of the focus actuator is moved along an axis parallel to the axis of rotation of the turntable so that the steadily appearing excursion of the focus actuator is eliminated.

In FIG. 1, the reference numeral 71 denotes a deviation detecting capacitance, which is one of factors determining the frequency of the resonance circuit 72. The reference numerals 73, 74, and 75 respectively denote a frequency comparator, a reference frequency generator, and a power amplifier. The reference numeral 76 denotes a pickup which is illustrated as a schematic cross-sectional view, and includes a permanent magnet 77, a moving coil 78, an objective lens tube 79, an objective lens 80, and a detection electrode 81. The elements 77 through 80 together form a focus actuator. The reference numerals 82 and 83 respectively denote an information recording disc and an electric conduction surface of the disc and the deflection detecting capacitance 71 is formed between this electric conduction surface 83 and the detection electrode 81. Finally, the reference numerals 84, 85 and 86 denote a light beam, a servo amplifier, and a servo motor, respectively.

With this structure, when the disc 82 is rotated, the up-and-down fluctuation of the disc 82 is transformed to the change in the capacity of the detecting capacitance 71, and further to the change in the frequency of the resonance circuit 72. The frequency of the resonance circuit 72 is compared, in the comparator 73, with a reference frequency of the oscillator 74, and an output voltage corresponding to the frequency difference is supplied to the power amplifier 75. Thus the positioning of the objective lens is performed by supplying a drive current to the moving coil so that the position of the objective lens is kept constant. On the other hand, the output signal of the power amplifier 75 is used for controlling a drive mechanism having an integral characteristic such as the servo motor 86, through the servo amplifier 85. This drive mechanism drives the whole part of the pickup 76 or the focus actuator, and performs a control operation so that the integrated value of the output signal of the frequency comparator 73 becomes equal to 0.

In this way, the time averaging value of the current flowing through the moving coil 78 of the pickup 76 becomes equal to zero, so that the displacement of the focus actuator in the direct current fashion generated by the direct current is compensated. In this way, the focus actuator as the whole system can operate in the desired state.

However, in the case of the structure described, the delay in phase of the signal appears due to the integral characteristic which is mentioned above, the operation of the servo motor would be delayed with respect to the focus error, which in turn is added to the focus servo loop as a disturbance. In addition, due to the characteristic of the servo motor, it does not operate until when the drive current has reached a predetermined level. However, if a low level dc component is always applied to the servo motor, it will remain inoperative and will cause a problem of the generation of heat.

OBJECT AND SUMMARY OF THE INVENTION

An object of the present invention is therefore to provide a height adjusting device for a pickup which can eliminate the steadily appearing displacement of the focus actuator without causing any disturbance to the focus servo system.

In order to attain the above object, according to the first aspect of the present invention, the height adjusting device comprises a support mechanism for supporting the pickup on a carriage in a manner that the height position of the pickup along the axis of rotation of the turntable of the optical disc player is adjustable and an adjusting means for driving the support mechanism to adjust the height position of the pickup, wherein the adjusting means comprises a positional signal generating means for generating a height position signal indicating the height position of the pickup and a drive circuit for driving the support mechanism in response to the magnitude of the height position signal only when the magnitude of the height position signal is greater than a predetermined level.

According to a second aspect of the present invention, the height adjusting device comprises a support mechanism for supporting the pickup on a carriage in a manner that the height position of the pickup along the axis of rotation of the turntable of the optical disc player is adjustable and an adjusting means for driving the support mechanism to adjust the height position of the pickup, wherein the adjusting means comprises a positional signal generating means for generating a height position signal indicating the height position of the pickup, a signal superimposing means for superimposing a compensating signal indicative of the position of the optical system of the pickup relative to the housing of the pickup on the height position signal and obtaining a compensated height position signal, and a drive circuit for driving the support mechanism in response to the magnitude of the height position signal.

According to the third aspect of the present invention, the height adjusting device for a pickup comprises a support mechanism for supporting the pickup on a carriage in a manner that the height position of the pickup along the axis of rotation of the turntable of the optical disc player is adjustable and an adjusting means for driving the support mechanism to adjust the height position of the pickup, wherein the adjusting means comprises a positional signal generating means for generating a height position signal indicating the height position of the pickup, a signal superimposing means for superimposing a compensating signal indicative of the position of the optical system of the pickup relative to the housing of the pickup on the height position signal and obtaining a compensated height position signal, and a drive circuit for driving the support mechanism in response to the magnitude of the height position signal only when the magnitude of the height position signal is greater than a predetermined level.

BRIEF DESCRIPTION OF THE DRAWINGS

FIG. 2 is a block diagram showing a first embodiment of the height adjusting device according to the present invention;

FIG. 3 is a block diagram showing another embodiment of the present invention;

FIGS. 4A and 4B are diagrams for explaining the displacement of the optical system caused by the gravity;

FIGS. 5A through 5D are waveform diagrams showing the operation of the circuit shown in FIG. 2;

DETAILED DESCRIPTION OF THE PREFERRED EMBODIMENTS

Figure 1:
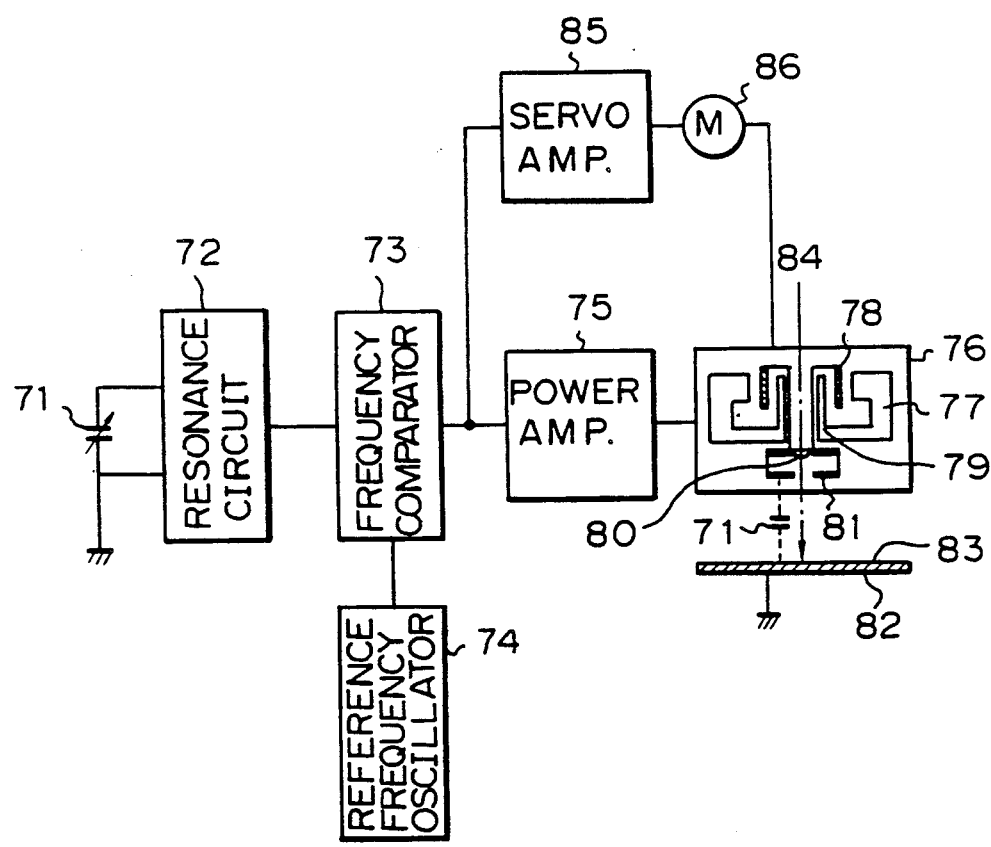
FIG. 1 is a block diagram showing an example of conventional height adjusting device.

The first embodiment of the present invention will be described with reference to FIG. 2 of the accompanying drawings. In FIG. 2, elements or parts of the circuit corresponding to those in the circuit shown in FIG. 1 are indicated by the same reference numerals.

As shown in FIG. 2, a dc (direct current) component such as illustrated in FIG. 5B is separated from the focus error signal as illustrated in FIG. 5A which is generated by a method using astigmatism, for example. This focus error signal is also supplied to a focus servo system of an ordinary design which is not illustrated in the figure.

The dc component functioning as a height position signal is supplied to a subtracting circuit 10 operating as a signal superimposing means, in which a compensating voltage of $+Va$ or $-Va$ is added to the dc component so that the level adjustment is performed.

Figure 7:
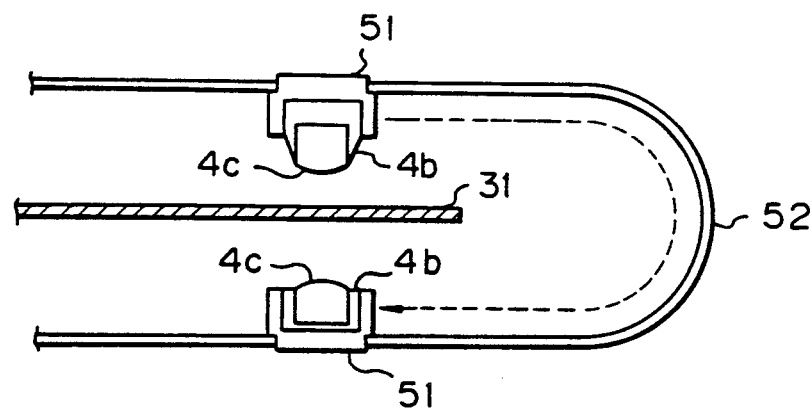
FIG. 7 is a diagram for explaining the movement of the pickup for playing both sides of a disc.

The compensating voltage Va is provided for compensating for the displacement, caused by the gravity, of the moving part such as the objective lens 4c which is movably supported on the body 4a of the pickup 4 via a suspension 4b, as illustrated in FIG. 4A. The dc voltage Va corresponding to the displacement by the gravity is added to the above-mentioned dc component so that the distance d of the objective lens 4c from the disc 31 is maintained as illustrated in FIG. 4B. The polarity (positive or negative) of the dc voltage Va is determined depending on the relative position of the objective lens 4c of the pickup 4 with respect to the disc 31. Specifically, in the case of a mechanism for automatically playing both sides of a disc as illustrated in FIG. 7, a pickup moving device 51 is moved along a guide rail 52 extending both upper and lower side of the disc 31. As a result of this movement, the direction of the pickup is turned over so that the direction to which the suspension 4b is extended by the gravity is reversed. Therefore, the polarity of the compensation voltage is determined in accordance with the above positional state of the pickup. In addition, the pickup includes an objective lens positioning device which in turn includes at least an objective lens, a suspension, a coil and a magnetic circuit. However, in the diagrams of FIGS. 4A, 4B, and 7, the objective lens positioning device such as a coil for driving the objective lens and a magnetic circuit, the light source, and the photo-electric converting devices are omitted for the simplicity.

The above-described compensating voltage is generated, for example, by a displacement sensor 10a for sensing the positional difference between the optical system of the pickup and the housing of the pickup which corresponding to the displacement of the optical system which is caused by the gravity, and the direction of the positional difference. An example of such displacement sensors is disclosed in Japanese Utility Model application No. UM63-13760. The output signal of the displacement sensor is supplied to a level hold circuit 10b, and the dc voltage $+Va$ or $-Va$ is obtained for example by supplying a hold command signal to the level hold circuit 10b when the focus servo is locked after an output to the servo motor 3 which will be described later is once shut off.

The level compensated dc component, that is, the compensated level signal is supplied to a window comparator 11 and one of two input terminals of a changeover switch 12. A ground level signal is supplied to the other one of the input terminals of the changeover switch 12. The window comparator 11 generates a high level signal such as illustrated in FIG. 5C when the above-mentioned compensated level signal becomes outside a range between $\pm V$ as illustrated in FIG. 5B. This high level signal from the window comparator 11 is supplied to the changeover switch 12 as a switch control signal. Therefore, the changeover switch 12 produces such an output signal as illustrated in FIG. 5D which is at a reference level causing no operation of the servo motor 3 in the later stage, when the level of the compensated level signal is relatively low, and which has the level of the compensated level signal when the compensated level signal exceeds $+V$ or $-V$. This output signal of the changeover switch 12 is amplified by a servo amplifier 2, and in turn supplied to the servo motor 3. Since the level of the signal supplied to the servo motor 3 is relatively high, the motor 3 generates a relatively large driving force from the beginning, so that the height adjustment of the whole system of the focus actuator is performed.

Figure 6:
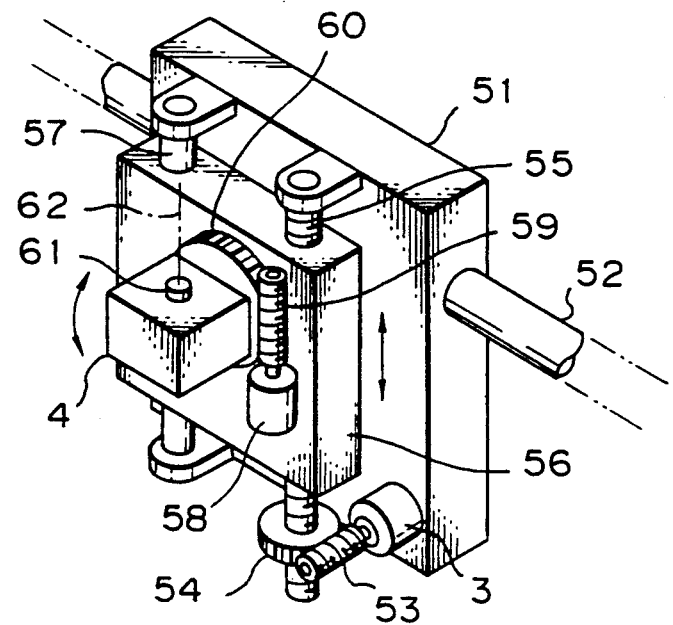
FIG. 6 is a diagram showing the construction of the pickup 4.

FIG. 6 shows the mechanism for moving the pickup, in which a worm gear 53 is fixed to the spindle of the afore-mentioned servo motor 3, and a screwed shaft 55 on which a gear meshed with the worm gear 53 is mounted is rotated so that a carriage member 56 on which the pickup 4 is mounted is moved along a guide 57 rod upward or downward. With this mechanism, the pickup 4 is moved in the direction of the optical axis 62 of the objective lens 61. In addition, a tilt angle adjusting motor 58 is mounted on the carriage member 61, and a gear 60 is rotated in the normal and reverse direction via a worm gear 59 fixed on the spindle of the motor 58, so that what is called tilt adjustment is performed.

In this way, the adjustment of the height position of the pickup is performed when the level of the low frequency component of the focus error signal exceeds the reference range, so as to reduce the level of the low frequency component of the focus error signal. Furthermore, the height position of the pickup is also adjusted so that the margin of the movement of the suspension is recovered with respect to the displacement of the optical system due to the gravity.

Another embodiment of the present invention will be described with reference to FIG. 3 of the accompanying drawings. In FIG. 3, elements or parts of the circuit corresponding to those in the circuit shown in FIG. 2 are indicated by the same reference numerals.

As shown in FIG. 2, the dc component is separated from the focus error signal by means of an LPF1 which is made up of a resistor R1 and a capacitor C1. The compensated level signal, in this embodiment, is obtained by superimposing the afore-mentioned compensating voltage Va or −Va on the dc component by means of a resistor R5. This compensated level signal is supplied to an inverting amplifier 21 which is made up of resistors R2 through R4 and an operational amplifier $OP_1$. The output signal of the inverting amplifier 21 is supplied to an input terminal of a voltage dividing circuit made up of resistors $R_6$ and $R_7$. To the input and output terminals of the voltage dividing circuit, the emitters of an NPN transistor $Q_1$ and a PNP transistor $Q_2$ and the bases of transistors $Q_1$ and $Q_2$ are respectively connected. The collectors of the transistors $Q_1$ and $Q_2$ are connected to an input resistor $R_8$ of the servo amplifier 2. The resistors $R_6$ and $R_7$, the transistors $Q_1$ and $Q_2$ together form an insensible zone circuit. The insensible zone circuit is operative to determine the operating level of the transistors $Q_1$ and $Q_2$ with respect to the output signal of the inverting amplifier circuit 21 by suitably determining the resistance ratio between the resistors $R_6$ and $R_7$. Specifically, the operation of the insensible zone circuit is such that the transistor $Q_1$ is made conductive when the output of the inverting amplifier circuit 21 increases in the negative direction and has exceeded a predetermined level in the negative direction under a condition that the polarity of the output signal of the inverting amplifier circuit 21 is negative, so that the compensated level signal is transmitted to the servo amplifier 2, and the transistor $Q_2$ is made conductive to relay the compensated level signal to the servo amplifier 2 when the output signal of the inverting amplifier circuit 21 increases in the positive direction and has exceeded the predetermined level in the positive direction under a condition that the polarity of the output signal of the inverting amplifier circuit 21 is positive. Therefore, the output signal of the insensitive zone circuit becomes as illustrated in FIG. 5D. This output signal is amplified by means of the servo amplifier 2, and supplied to the servo motor 3, so that the position of the pickup as a whole is adjusted.

In this way, the position of the focus actuator or the pickup as a whole is controlled when the dc component of the focus error signal has exceeded a predetermined value. As a result, the position control is initiated only when the stationary displacement becomes relatively large, which in turn is effective to suppress the disturbance to the focus servo loop, so that the occurrence of the hunting is reduced. In addition, since the drive signal is supplied to the servo motor 3 only when the position control of the pickup as a whole is required, the motor will generate less amount of heat than a structure in which the drive current is always supplied to the servo motor. Moreover, since the initial drive current is relatively large, there is an advantage that the arrangement allows the use of a motor having a low sensitivity.

In addition, by the application of the aforementioned compensation voltage, the position of the pickup as a whole is adjusted also against the hanging motion caused by the gravity of the movable parts such as the objective lens, so that the objective lens is maintained at a center position of the stroke of its movement. Thus, decrease in the stroke of the objective lens which would be caused by the gravity is canceled and the original range of the movement to be traced by the objective lens in accordance with the focus servo operation is maintained.

In the embodiments described above, the low frequency component of the focus error signal is used as the height position signal indicative of the height position of the pickup. However, this is not limitative and the signal indicative of the distance between the focus actuator and the disc, as used in the conventional arrangement, can be used instead of the low frequency component of the focus error signal. Furthermore, this signal may be replaced by the signal indicative of the relative position of the optical system of the pickup with respect to the housing of the pickup, i.e., the output signal of the aforementioned displacement sensor.

As specifically described in the foregoing, the height adjusting device according to the present invention is constructed to perform the height adjustment of the pickup in accordance with the height position signal only when the level of the height position signal such as the low frequency component of the focus error signal is higher than a predetermined level. Thus, the disturbance to the focus servo system as well as the heat generated by the servo motor are reduced, and the starting characteristic of the servo motor is also improved. Furthermore, by superimposing the compensating signal such as the compensating voltage on the height position signal, the hanging movement of the optical system of the pickup by the gravity is canceled by the displacement of the housing of the pickup, so that the stroke of the optical system is maintained sufficiently.

What is claimed is:

1. A height adjusting device for adjusting the height of a pickup mounted on a carriage of an optical disc player, said device comprising:
    a support mechanism for supporting the pickup on said carriage in a manner that a position of the pickup is adjustable in both the tracking and focusing directions along an axis of rotation of a turnable; and
    an adjusting means for driving the support mechanism to adjust the position of the pickup in a vertical manner, wherein said adjusting means comprises a positional signal generating means for generating a height position signal indicative of the position of the pickup in vertical distance from the turntable and a drive circuit for driving the support mechanism to adjust the height of the pickup from the turntable in response to the magnitude of the height position signal only when the magnitude of the height position signal is greater than a predetermined level.

2. A height adjusting device for adjusting the height of a pickup mounted on a carriage of an optical disc player, said device comprising:

a support mechanism for supporting the pickup on a carriage in a manner that a position of the pickup along an axis of rotation of a turntable of said optical disc player is adjustable; and an adjusting means for driving said support mechanism to adjust the position of the pickup, wherein said adjusting means comprises a positional signal generating means for generating a height position signal indicative of the position of the pickup, a signal superimposing means for superimposing a compensating signal, generated by said height positional signal generating means, indicative of a position of an optical system of the pickup relative to a housing of the pickup on the height position signal and obtaining a compensated height position signal, and a drive circuit for driving the support mechanism in response to the magnitude of the compensated height position signal.

3. A height adjusting device for adjusting the height of a pickup mounted on a carriage of an optical disc player, said device comprising:

a support mechanism for supporting the pickup on said carriage in a manner that a position of the pickup along an axis of rotation of a turntable of said optical disc player is adjustable; and an adjusting means for driving the support mechanism to adjust the position of the pickup, wherein said adjusting means comprises a positional signal generating means for generating a height position signal indicative of the position of the pickup, a signal superimposing means for superimposing a compensating signal, generated by said height positional signal generating means, indicative of a position of an optical system of the pickup relative to a housing of the pickup on the height position signal and obtaining a compensated height position signal, and a drive circuit for driving the support mechanism in response to the magnitude of the compensated height position signal only when the magnitude of the compensated height position signal is greater than a predetermined level.

4. A height adjusting device as set forth in claim 2, wherein said compensating signal is a signal indicative of a position of said optical system with respect to the housing of the pickup when a focus servo system of the optical disc player is in a locked state.

5. A height adjusting device as set forth in claim 3, wherein said compensating signal is a signal indicative of a position of said optical system with respect to the housing of the pickup when a focus servo system of the optical disc player is in a locked state.

6. A height adjusting device as set forth in claim 1, wherein said height position signal is a signal indicative of the level of a low frequency component of a focus error signal of a focus servo system of said optical disc player.

7. A height adjusting device as set forth in claim 1, wherein said height position signal is a signal indicative of a distance between said pickup and an information recording disc loaded in said optical disc player.

8. A height adjusting device as set forth in claim 2, wherein said height position signal is a signal indicative of the level of a low frequency component of a focus error signal of a focus servo system of said optical disc player.

9. A height adjusting device as set forth in claim 3, wherein said height position signal is a signal indicative of the level of a low frequency component of a focus error signal of a focus servo system of said optical disc player.

10. A height adjusting device as set forth in claim 4, wherein said height position signal is a signal indicative of the level of a low frequency component of a focus error signal of a focus servo system of said optical disc player.

11. A height adjusting device as set forth in claim 5, wherein said height position signal is a signal indicative of the level of a low frequency component of a focus error signal of a focus servo system of said optical disc player.

12. A height adjusting device as set forth in claim 2, wherein said height position signal is a signal indicative of a distance between said pickup and an information recording disc loaded in said optical disc player.

13. A height adjusting device as set forth in claim 3, wherein said height position signal is a signal indicative of a distance between said pickup and an information recording disc loaded in said optical disc player.

14. A height adjusting device as set forth in claim 4, wherein said height position signal is a signal indicative of a distance between said pickup and an information recording disc loaded in said optical disc player.

15. A height adjusting device as set forth in claim 5, wherein said height position signal is a signal indicative of a distance between said pickup and an information recording disc loaded in said optical disc player.

* * * * *